United States Patent
Schoelkopf

[11] 4,215,874
[45] Aug. 5, 1980

[54] ARTICULATION LOCK

[75] Inventor: James E. Schoelkopf, Terre Haute, Ind.

[73] Assignee: J. I. Case Company, Racine, Wis.

[21] Appl. No.: 970,418

[22] Filed: Dec. 18, 1978

[51] Int. Cl.³ ............................................. B62D 13/00
[52] U.S. Cl. ................................... 280/474; 180/134; 280/400; 280/432
[58] Field of Search ............... 280/474, 432, 426, 442, 280/400; 180/134, 51, 52, 235, 265

[56] References Cited

U.S. PATENT DOCUMENTS

| | | | |
|---|---|---|---|
| 1,655,351 | 1/1928 | Altgelt | 280/474 |
| 2,544,924 | 3/1951 | Herold | 16/35 R |
| 3,046,037 | 7/1962 | Cain | 280/477 |
| 3,191,709 | 6/1965 | Symons | 180/51 |
| 3,680,890 | 8/1972 | Magown | 280/474 |

Primary Examiner—John P. Silverstrim

[57] ABSTRACT

An articulation lock is disclosed for locking the pivot connection between the front and rear frames of an articulated vehicle for operations such as maintenance and transporting. The articulation lock includes a sector-shaped locking plate mounted to the forward end of a pivot plate on the rear frame and having a plurality of arcuate recesses which establish locking positions. As the vehicle articulates, the locking plate passes between a pair of pivot plates on the front frame. A removable locking pin is stored next to the operator's seat, and the operator removes it from storage and pushes it into a lock hole in the top pivot plate of the pair of pivot plates on the front frame when it is desired to lock the articulation joint. When one of the locking plate recesses is vertically aligned with the lock hole, the pin is passed through the lock hole in the top pivot plate, then through the arcuate recess in the locking plate, and finally through a hole in the other pivot plate of the pair to lock the articulation pivot joint. The operator can lock the vehicle without leaving the operator's cab and while the vehicle is running. Further, the locking plate is shaped to aid the operator in locking and unlocking the joint, and it permits the storage position of the lock pin to be closely spaced to the lock hole.

1 Claim, 4 Drawing Figures

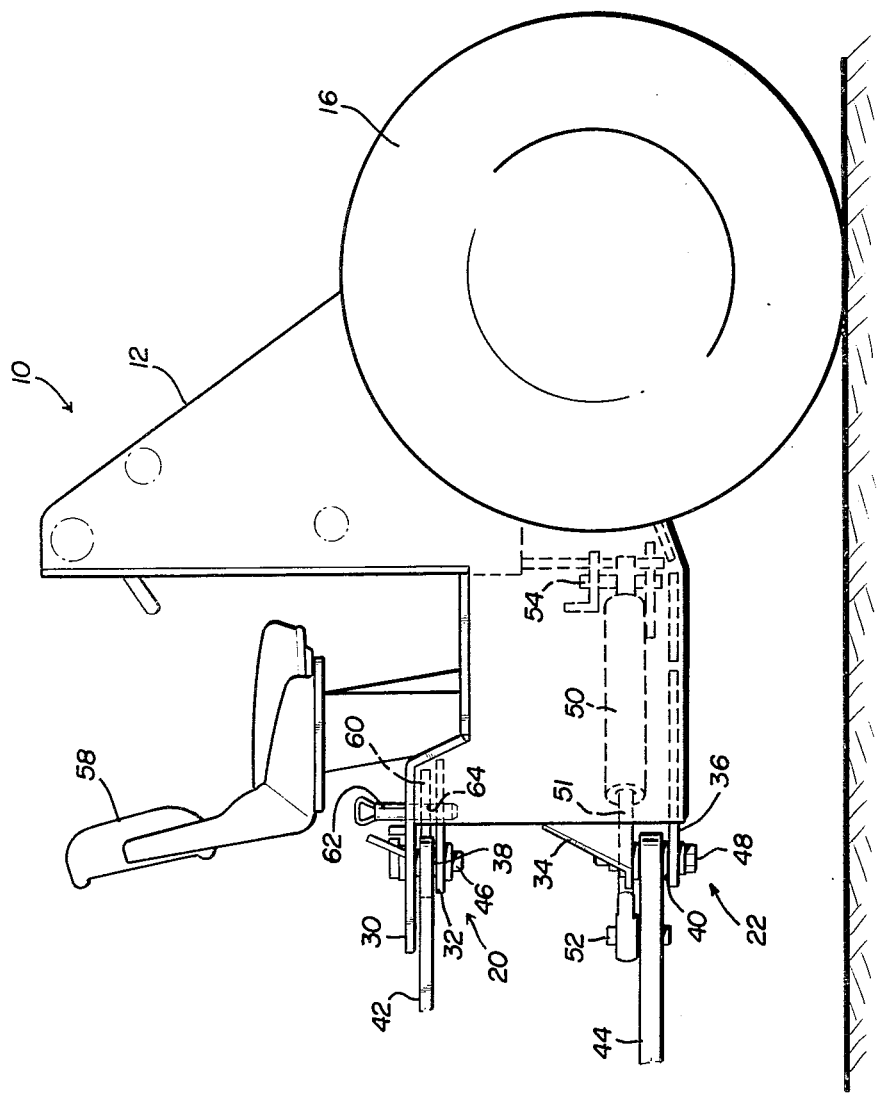
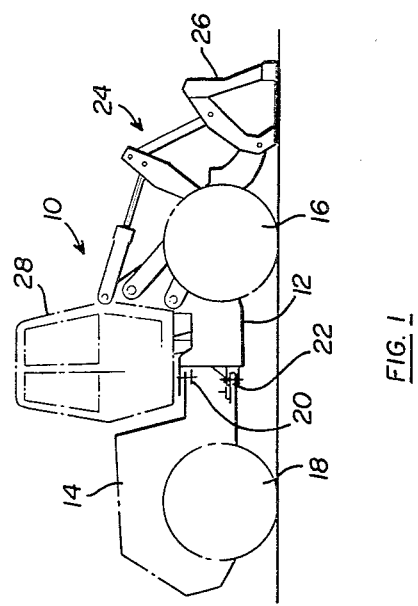
FIG. 1
FIG. 2

ARTICULATION LOCK

BACKGROUND OF THE INVENTION

The present invention relates to an articulated vehicle and more particularly to an articulation lock for locking the articulating joint between the two bogies or frames of the articulated vehicle.

It is known to provide articulated vehicles having articulated bearings which pivotally connect a front bogie with a rear bogie of the vehicle. These vehicles are usually steered by a pair of hydraulic actuators mounted on opposite sides of the articulation joint centerline. One hydraulic actuator is extended while the other is retracted to pivot the vehicle to the left or right about the articulation joint. The hydraulic actuators control the pivoting as long as there is pressurized fluid in the hydraulic system.

There are numerous occasions when it is necessary to lock the articulating joint in a fixed position such as for transportation or maintenance. When the vehicle is being transported, and the power is turned off, there is a need for an articulating joint lock so that the front and rear bogies do not shift out of alignment on the transporter. Another situation where a lock is needed occurs when a person is performing maintenance on the vehicle, and it is desirable that the vehicle be articulated and locked to a maximum position either right or left.

The front and rear bogies are large, and when the power is off the vehicle may articulate when parked, especially on an incline. Thus, when the power steering is deactivated, the pivot joint is freely pivotable, and it is difficult to hold the immense frames in a fixed position if the joint is not locked.

The prior art articulation locks have not been satisfactory because the operator has had to leave the operator's cab to lock the articulation joint. One prior art approach requires that the operator lock the joint by using a lock bar between the front and rear frames. This is a cumbersome arrangement because the frames have to be aligned and the lock bar may be lost or not readily available. Thus, the vehicle may be left unlocked because the prior art devices are typically inconvenient and time-consuming to use.

There is a need for an articulation lock that can be engaged when the machine is running and the operator is still in the operator's cab. For maintenance purposes and other reasons, it is desirable to lock the vehicle in a straight-ahead position, a maximum left position, or a maximum right position. This can be done most easily while the machine is still running and the operator has power to articulate the frames to the desired position. Convenience is a primary reason for locking the pivot joint while the machine is running and the operator is in the cab. It is desirable that the operator be able to lock the vehicle joint in the desired position before he turns the power off and leaves the cab. Otherwise, he may not trouble himself in locking the machine, and the frame then becomes subject to the undesired movement about the pivot joint and disadvantages described hereinbefore.

These disadvantages in present articulation lock constructions have resulted in the articulation lock in the present invention which permits the operator of an articulated machine to lock the vehicle while it is running without leaving the operator's compartment.

SUMMARY OF THE INVENTION

In accordance with the present invention, an articulation lock is provided for locking the pivot connection between sections of an articulated vehicle, the lock being operable by the operator without his leaving the operator's cab.

The articulation lock of the present invention may be utilized in an articulated vehicle comprising forward and rearward units which are interconnected by vertically spaced bearing members. The articulation lock enables the operator to lock the vehicle in a straight-ahead position, maximum right position, or maximum left position while the machine is running and without leaving the operator's cab. The operator can lock the vehicle from articulating without dismounting the vehicle and getting into the articulation area to lock the joint in the desired position. Thus, the pivot connection between the sections of the vehicle may be conveniently locked to prevent undesirable shifting of the frames as previously described.

The articulation lock includes a sector-shaped articulation locking plate mounted to the forward end of the top pivot plate on the rear frame and having a plurality of arcuate recesses which establish locking positions. As the machine articulates, the locking plate passes between the top two pivot plates on the front frame. A removable locking pin is stored next to the operator's seat in a storage hole, and the operator removes the pin from its stored position and drops it into a lock hole in the floor of the operator's cab when it is desired to lock the articulation joint.

When one of the locking plate recesses is vertically aligned with the lock hole, the pin passes downwardly first through the lock hole in the top pivot plate of the front frame, then through one of the plurality of arcuate recesses in the locking plate, and finally into a hole in the lower pivot plate of the front frame. The holes in the top and lower pivot plates are vertically aligned, and the desired arcuate recess of the locking plate is brought into alignment with the top and lower holes by operating the steering hydraulic cylinders until the locking plate recess is aligned.

The operator determines that there is alignment by either looking downwardly through the lock hole or pushing the lock pin downwardly through the hole and operating the steering cylinders until the desired arcuate recess on the locking plate comes into position. The articulation lock enables the operator to lock the vehicle in a straight-ahead position, maximum right position, or maximum left position. the operator does not need to leave his seat during the locking operation.

In the preferred embodiment, the locking plate is generally sector-shaped and has at least three arcuate, open-ended recesses or lock positions for straight-ahead, maximum right, or maximum left locking. The arcuate recesses or locking positions are configured to aid the operator in aligning a locking position on the locking plate with the vertically aligned lock holes in the top and lower pivot plates. The locking positions on the plate are intentionally open-ended arcuate recesses so that the operator can pass the lock pin through the locking plate without visually sighting through the lock hole to insure alignment. He does this by pushing downwardly on the lock pin in the lock hole while simultaneously causing the steering cylinder to shift the frames until a recess in the locking plate comes into alignment. The articulation lock is conveniently located under the operators seat and easy to use which eliminates the disadvantages of the prior art constructions.

The sector-shape of the locking plate and open-ended arcuate recesses also provide other unexpected advantages. The storage hole for the locking pin is conveniently located to the operator under his seat, and it is also close to the lock hole. This is permitted because of the arcuate shape of the locking plate periphery. The proximity of the storage hole and lock hole allows the operator to sit in his seat during the entire locking process. To unlock the joint, the operator merely pulls upwardly on the lock pin pull ring, and the open-ended locking plate recess again aids the operator because it does not bind the pin as it is being removed.

The present invention is particularly simple in construction, installation, maintenance and operation. At the same time, it eliminates conventional complex and cumbersome locking arrangements. Other advantages and meritorious features of the articulation lock of the present invention will be more fully understood from the following description of the preferred embodiment, the appended claims, and the drawings, a brief description of which follows.

BRIEF DESCRIPTION OF DRAWINGS

FIG. 1 is a side view of the articulated vehicle having the articulation lock of the present invention for locking the pivot joint between the front and rear frames;

FIG. 2 is a fragmentary, cross-sectional side view of the articulated vehicle shown in FIG. 1 and illustrating the pivot joint area, operator's cab, and articulation lock in its locked position;

DESCRIPTION OF THE PREFERRED EMBODIMENT

Figure 3:
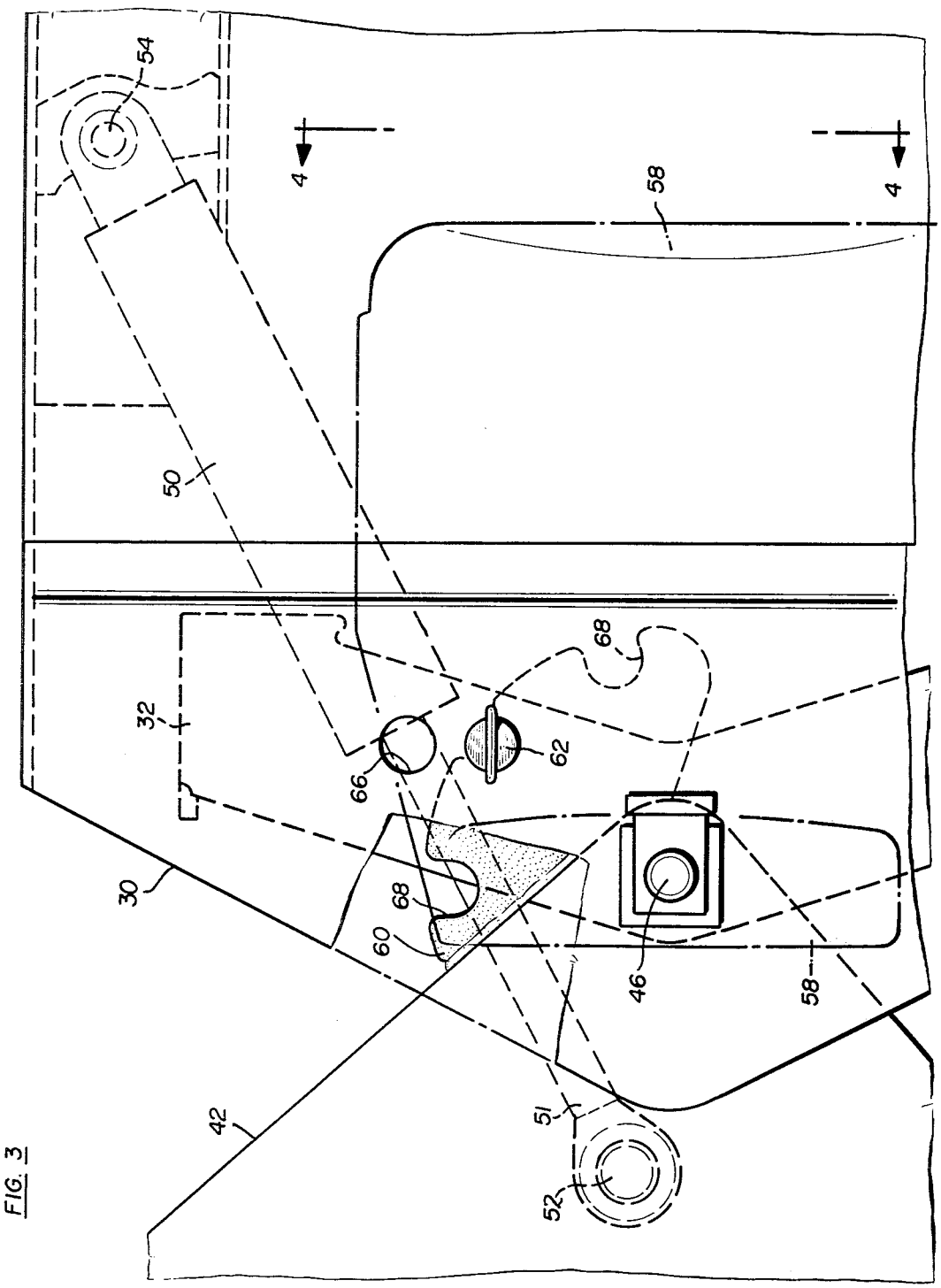
FIG. 3 is a fragmentary top plan view of the pivot joint area including a cut-away portion illustrating the articulation lock of the present invention in its locked position.

A preferred embodiment of an articulated vehicle including an articulated lock made in accordance with the teachings of the present invention is illustrated in FIGS. 1–4.

Referring to FIG. 1, an articulated, front end loader 10 is shown. The articulated vehicle 10 comprises a forward unit or bogie 12 supported on wheels 16 and a rear unit 14 supported on wheels 18. The bogies 12 and 14 are interconnected by vertically spaced articulating bearing assemblies 20 and 22 which form an articulating joint between the two frames. The front section 12 of the loader is provided with a boom assembly 24 for supporting and operating a bucket 26. An operator's cab 28 is mounted on the front unit above the articulating bearing assemblies 20 and 22.

Referring to FIG. 2, the rear portion of the front section or bogie 12 is provided with a pair of vertically spaced upper pivot plates 30, 32 and a pair of vertically spaced lower pivot plates 34, 36. The two pairs of pivot plates provide for vertically spaced pivot structures. Vertically spaced pivot plates 42, 44 form part of the rear frame section 14. Spherical bearings 38, 40 are secured to the upper and lower pivot plates 42, 44 from the rear frame section.

The upper pivot plates 30, 32, 42 and the lower pivot plates 34, 36, 44 form two articulating bearing assemblies 20 and 22. Axially aligned pivot pins 46, 48 permit relative pivotal motion of the frames about a vertical axis. The front section of the loader 12 can pivot about the vertical axis of the pivot pins 46, 48 relative to the rear section 14.

Hydraulic cylinders 50 are provided on either side of the articulation joint for selectively pivoting the units about the vertical axis to effect steering of the articulating vehicle. The steering cylinders 50 (only one of which is shown) have piston rods 51, and each cylinder is pivotally mounted at one end to lower pivot plate 44 by pin 52 and on its other end to frame 12 by pin 54. One hydraulic cylinder 50 is extended while the other is retracted to pivot the vehicle to the left or right about the articulated joint.

Figure 4:
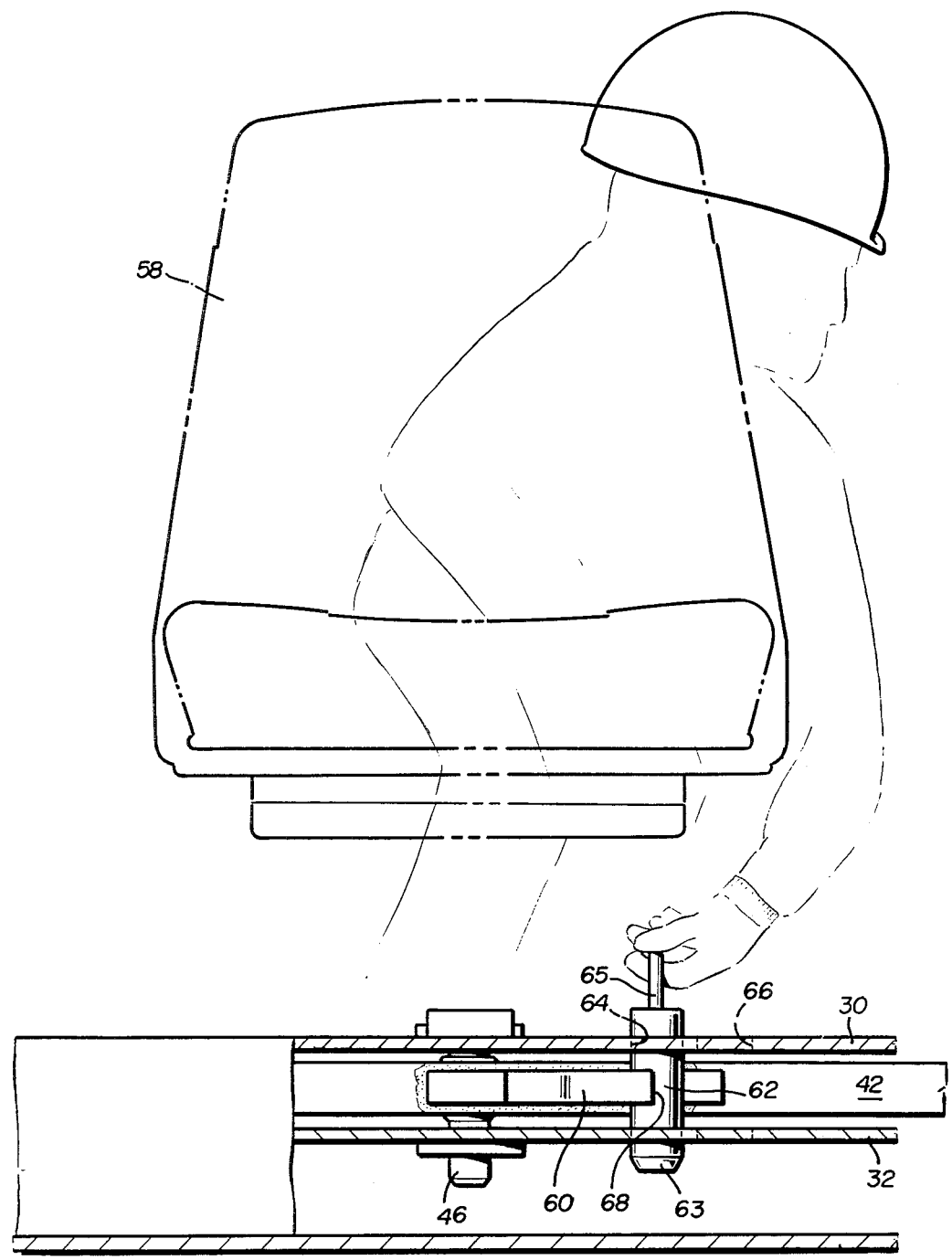
FIG. 4 is a cross-sectional view taken along line 4—4 in FIG. 3 illustrating the operator's insertion of the lock pin into the locking plate.

As illustrated in FIGS. 2–4, the articulation locking plate 60 is generally sector-shaped. In plan view, it is shaped like part of a circle bounded by two radaii and an arc included between them. It is welded or otherwise secured to the forward end of pivot plate 42. Plate 60 has three open-ended, arcuate recesses 68 which establish locking positions for the articulation joint of straight-ahead, maximum right, and maximum left. More or less than three locking positions are within the scope of the present invention. The open-ended arcuate recesses are configured to aid the operator when he locks or unlocks the vehicle in one of the locking positions. Further, the arcuate shaped periphery of the locking plate 60 permits other advantages as will be described.

Referring to FIGS. 2 and 4, the operator sits on seat 58 in the cab 28. A locking pin 62 is normally stored next to the operator's seat in a storage hole 66. The locking pin has a chamfered end portion 63 and a pull ring 65. The operator can lock the vehicle using the locking pin 62 in a straight-ahead position, maximum right position, or maximum left position while the machine is running and without leaving the operator's cab.

The operation of the articulation lock will be described by reference to FIG. 3 and 4. As the machine articulates, the sector-shaped locking plate 60 passes between the top two pivot plates 30 and 32 on the front frame. The locking pin 62 is stored next to the operator's seat 58 in a storage hole 66, and the operator removes the pin from its stored position and drops it into the lock hole 64 in the floor of the operator's cab when it is desired to lock the articulation joint. The storage hole 66 and lock hole 64 are in very close proximity which is only possible because of the arcuately shaped locking plate 60.

The operator determines that there is alignment between one of the arcuate recesses 68 and lock hole 64 by either looking downwardly through the lock hole 64 or pushing downwardly on the lock pin 62 while simultaneously causing the steering cylinders 50 to shift the frames 12, 14 until an arcuate recess 68 in the locking plate comes into alignment. In locking the joint, the pin 62 passes downwardly through the lock hole 64 in the top pivot plate 30 of the front frame, then through one of the plurality of arcuate recesses 68 in the locking plate 60, and finally into a hole in the lower pivot plate 32 of the front frame. The holes 64 in the top and lower pivot plates 30, 32 are vertically aligned, and the desired arcuate recess 68 of the locking plate 60 is brought into alignment with the top and lower holes by operating the steering hydraulic cylinders until the locking plate recess is aligned.

The locking positions 68 on the lock plate 60 are intentionally open-ended arcuate recesses so that the operator can pass the lock pin 62 through the locking plate without visually sighting through the lock hole 64 to insure alignment. The operator pushes downwardly on the lock pin 62 in the lock hole 64 while simultaneously causing the steering cylinders 50 to shift the frames until a recess in the locking plate comes into alignment. The operator then passes the locking pin through the locking plate to lock the articulating point.

The operator does not need to leave his seat during the locking operation. The articulation lock of the present invention enables the operator to lock the vehicle in a straight-ahead position, maximum right position, or maximum left position, however, other locking positions are within the scope of the present invention. The articulation lock permits the operator to lock the pivot joint while the machine is running and the operator is still in the cab. This permits the machine to be locked during the most convenient time while the machine is still running and the operator has power to articulate the frames into the desired position before he leaves the cab. Thus, the present invention eliminates the disadvantages of the prior articulation lock constructions.

To unlock the joint, the operator merely pulls the locking pin 62 from the lock hole 64 and replaces the pin in its storage hole 66. The arcuate recess locking positions 68 aid the operator because they do not bind the lock pin 62 as it is being removed.

It will be apparent to those skilled in the art that the foregoing disclosure is exemplary in nature rather than limiting, the invention being limited only by the appended claims.

I claim:

1. An articulation locking arrangement for locking the pivot connection between first and second frames of an articulated machine;

said pivot connection including at least one pair of pivot plates mounted on said first frame and at least one pivot plate mounted on said second frame and a pivot pin interconnecting said pivot plates for permitting pivotal movement by said frames about a vertical axis, said pivot plates and pivot pin forming an upper pivot joint between said frames;

an articulation locking plate extending from said pivot plate on said second frame and said locking plate extending in the plane of said pivot plate on said second frame, said articulation locking plate being sector-shaped and said locking plate having an arcuate end portion and a plurality of arcuate recesses along said arcuate end portion for locking said machine in straight-ahead, maximum right, and maximum left positions;

an operator's station being mounted on said machine above said pivot joint, said operator's station including an operator's seat and floor;

said pivot plates on said first frame and said floor of said operator's station having vertically aligned locking openings and vertically aligned storage openings spaced from said locking openings, said locking openings being proximate said operator's seat and said storage openings being spaced radially outwardly from said locking openings, and a locking pin being normally stored in said storage openings; and said locking plate being swingable between said pair of pivot plates on said first frame as said machine articulates and a selected one of said plurality of locking recesses in said locking plate becoming vertically aligned and registerable with said locking openings such that said locking pin may be removed by an operator from said storage openings and inserted through said locking openings and said selected locking recess in said locking plate to thereby selectively lock said pivot connection in a fixed position without the operator leaving the operator's seat, and said arcuate recesses in said locking plate being open-ended for permitting said locking pin to pass through said locking plate without binding.

* * * * *